2,996,489
RESIN COMPOSITIONS OF IMPROVED TOLERANCE FOR HIGH TEMPERATURES AND PROCESS OF PRODUCING SAME

Mark L. Dannis, Maple Heights, and Floyd L. Ramp, Brecksville, Ohio, assignors to The B. F. Goodrich Company, New York, N.Y., a corporation of New York
No Drawing. Filed Jan. 8, 1958, Ser. No. 707,672
10 Claims. (Cl. 260—92.8)

The present invention relates generally to vinyl compositions having increased high temperature tolerance including good heat resistance and materially increased softening or flow points. More specifically, the invention relates to a rigid type of vinyl resin having materially improved resistance to solvents, as well as being useful at higher temperatures, and to a process of producing same.

Vinyl chloride resins have been made in both the hard, rigid unplasticized condition and in the soft, flexible plasticized form. Both types suffer from the principal disadvantage of being unusable at moderately elevated service temperatures, the plasticized resins being unusable at temperatures exceeding about 75° C. Some of the resins sag badly while others decompose badly at even moderately elevated temperatures. Polyvinyl chloride, in its unplasticized condition, is a stable, strong, rigid material that has an added advantage of not supporting combustion. However, this rigid material usually is not employed in structural applications at temperatures exceeding about 60 or 70° C. Polyvinylidene chloride is somewhat similar and, in addition, has a very low second order transition temperature of about −20° C. and is less stable than polyvinyl chloride. Copolymers of these two monomers also have quite low softening points and poor stabilities. Blends of unplasticized polyvinyl chloride with one or more solid plasticizers, or resinous "processing aids," such as a styrene-acrylonitrile copolymer, are more easily processed but are not sufficiently stable and soften at lower temperatures than is desirable for many applications.

A growing use for rigid and semi-rigid compositions of the type described is in the form of extruded pipe, tubing and cable jacketing. However, because of low softening or "sag" temperatures, polyvinyl chloride pipe has been utilized principally where corrosion resistance, weather resistance, light resistance, flame resistance, etc. render other rigid plastics unusable. There is a need, therefore, for a composition having all the above-mentioned excellent properties of unplasticized polyvinyl chloride and, in addition, having increased tolerance for high temperature including outstanding resistance to decomposition by heat, greater dimensional stability and materially increased softening temperatures.

In the field of thermoplastic, structural dielectrics polystyrene and polyethylene have been dominant. Polystyrene suffers from heat distortion at moderately low temperatures and also from high flammability. Polyethylene also will burn quite rapidly. With most common plastic dielectric materials the loss factor increases with frequency in electronic applications. Since the tendency for the electronic industry is to push ever higher in frequency and service temperatures, it is becoming increasingly apparent that better plastic dielectrics are required.

Another objective of this invention is to provide an inexpensive method of making the plastic materials of this invention, such as are described herein, from cheap and readily available materials.

These and other objectives are achieved, according to this invention, in a high molecular weight chlorinated polyvinyl chloride resin having a structure in which at least 75%, more preferably at least 95%, and most preferably essentially all (i.e. at least 97–98%), of the chlorinated vinyl chloride units are 1,2-dichloroethylene units. Such products are thus distinguished over prior art chlorinated polyvinyl chloride resins which contain a significantly higher proportion (i.e. greater than 10%) of the chlorinated vinyl chloride units as the undesirable 1,1-dichloroethylene units. In addition, the products of this invention are distinguished over known polymers and clorinated polymers of 1,2-dichloroethylene by the materially higher molecular weight and stabilities of the former compared to the latter. The products of this invention have intrinsic viscosities of at least 0.90, more preferably of at least 1.0. Prior polymers of 1,2 dichloroethylene prepared by polymerization of 1,2-dichloroethylene monomer are very low in molecular weight because of the well-known chain transfer characteristics of the monomer. As to stabilities, the products of this invention are uniformly characterized by heat stabilities greater than those of the unchlorinated resins from which they are derived. To be "stable," according to this invention, the stabilizer-free chlorinated resin must be able to withstand heating (that is, not turn black or generate bubbles) in air for at least 10 minutes at 375° F. A good quality polyvinyl chloride will turn black, generate bubbles, and otherwise lose its integrity in 5 minutes or less under the same conditions.

Such products are further distinguished over prior known chlorinated resins by materially-reduced solubilities in common solvents, especially in those solvents utilized in varnishes and lacquers, and by higher softening temperatures, as compared to prior resins of comparable chlorine content. These latter properties, together with their higher molecular weight and their very materially improved resistance to heat, are characteristic of the products of this invention, irrespective of the extent to which the chlorination process has been carried.

The chlorinated products of this invention may be plasticized in much the same manner as any other vinyl chloride polymers, although the usual polyvinyl chloride plasticizers are somewhat less effective in the chlorinated resins. It is surprising, however, that the aforementioned improved properties of the chlorinated products are maintained to such a large degree, upon being combined with plasticizers of all types. Fillers, stabilizers, plasticizers, extenders, coloring dyes and pigments, mold-release agents, lubricants and other conventional additives also can be employed in the usual way.

General purpose types of commercially-available polyvinyl chloride have specific viscosities of 0.50 to 0.54, contain about 56.7% by weight chlorine, have a density of about 1.40 gms./cc., and have a second-order transition temperature of between about 75° to about 80° C. When, by the process of this invention, the density of the lightly-chlorinated polyvinyl chloride resin has been increased slightly, up to a maximum of about 1.42, a lightly-chlorinated product is obtained having an improved stability to heat and light and a second order transition temperature usually above about 80° C. While the reason for the improvement in properties is obscure, it may be that chlorination converts the small amount of unstable groupings (usually found in commercial-grade resins) to a more stable chlorinated form. For example, there is evidence that the commercial polyvinyl chlorides contain a small proportion of unsaturation which the chlorine may saturate. Only about 0.1 to 0.2% by weight of added chlorine will do this. Up to about 1% by weight of chlorine has this same effect. Products of this type are improved forms of polyvinyl chloride resins suitable in the usual polyvinyl chloride applications.

When, however, the chlorination is continued to the density range of about 1.43 to about 1.48, the product changes even more profoundly. Most surprisingly, these materials process more easily, without plasticizer, than the original resin, and at about the same processing temperatures. Also, the second order transition temperature increases rapidly to a value in the range of 80° to 90° C. and the product has a dipole peak (peak in the curve of a plot of loss factor vs. temperature at 1000 cycles) in the range of 105° to 115° C. Also the resistance of the chlorinated polymer to heat is considerably improved as shown by stabilizer-free samples withstanding heating in air for 10 to 20 minutes or more at 375° F. Such improvement in heat stability is additive and synergistic with the action of conventional stabilizers. Resinous processing aids or other lubricants do not seem to be required for the formation of smooth milled sheets, although these latter materials may be utilized, if desired. Upon milling, the chlorinated resin forms a smooth sheet and clings to one of the rolls of a two-roll plastic mill at temperatures between 300° and 350° F. without breaking into the loose, lacy appearance characteristic of plasticizer-free polyvinyl chloride. Because of their improved processability this class of materials avoids the sensitivity to chemical attack introduced upon the addition of processing aids to unchlorinated polyvinyl chloride in rigid formulations.

Further increase in density in the range of from about 1.50 to about 1.54 produces resinous materials which are exceptionally hard, stiff and tough, yet which can be processed in conventional plastics processing equipment capable of being heated to 350° F. Chlorinated polyvinyl chlorides of this type exhibit a second order transition temperature of at least 110° C. and, even when suitably lubricated and stabilized, have a softening point at least 20° C. higher than similar formulations of the original polyvinyl chloride. The "dipole peak" of this type of material occurs at a temperature above about 120° C. and the loss factor at this "peak" temperature is below about 0.90 and below 0.09 at room temperature, these properties indicating utility as a cable and wire insulation. Because of the very materially increased processing temperatures required, this material, to be considered "stable," must withstand heating in air for at least 20 minutes at 400° F. when suitably stabilized. Materials in this density range are quite tough as indicated by Izod impact values of at least 0.6 lb. per inch of notch, usually between about 0.6 to about 0.8 lb. per inch of notch, without the addition of fillers and reinforcing materials.

When the chlorination reaction has progressed to a density of above about 1.58, and particularly in the range of above about 1.58 to about 1.65, the product has a second order transition temperature of at least about 130° C. For processing, these materials require stock temperatures above about 400° F. yet are easily molded or pressed to form clear sheets in as little as 1 minute to 400° F. under pressures of 5,000–10,000 lbs. per square inch. Such a material has a loss factor at 1,000 cycles (at room temperature) less than about 0.05. Most unusually, the loss factor of these materials at room temperature decreases with increasing frequency in the range at least up to 100 mc. The dipole peak of such a material usually occurs at a temperature not less than about 150° C. Thus, the materials of this class approach polystyrene in dielectric properties and, in addition, they can be used at higher temperatures, they will not support combustion, and they are considerably tougher than polystyrene. When suitably compounded these materials form a most novel material for application as a low-loss, heat- and combustion-resistant wire and cable insulation. Without plasticizer and/or lubricants, these same materials form a class of high-melting, heat-resistant, low-loss structural dielectrics. Materials of this class also can be solvent-spun to form superior filaments and fiber useful in chemical filter pads.

Still further increases in density produce what is essentially high moleclular weight poly-1,2-dichloroethylene having a density of 1.69 to 1.71 (theoretically 1.70). Such a material is most difficult to process by ordinary techniques although the special techniques and equipment developed for the high-softening poly-fluoroethylene resins can be employed. Poly-1,2-chloroethylene can be powder-sintered at 400–525° F. to form products of exceptional heat resistance and very good dielectric properties. These materials have second order transition temperatures in the range of 170–180° C. or more and heat resistance values of 20 minutes or more at 375° F. (unstabilized).

For general use by persons not particularly skilled in handling such high-softening materials, chlorinated products above about 1.48 in density require a stabilizer to prevent degradation while working-in of added ingredients. In general, from about 1 to about 10% by weight of a stabilizer will enable one to mix in other added ingredients without careful precautions being observed. Many of the known organic or metal-organic stabilizers have lubricating action so that a stabilized composition would more readily coalesce into a sheet on a plastic mill, or to a well-fused solid in an extruder or Banbury mixer. Dibutyl tin dilaurate, barium and cadmium stearates, tin-maleate types, epoxy-type esters and polymers, and the like, have this action. Solids such as basic lead carbonate can also be added to contribute ready-processability to the finished resin. Stabilized resins of this type are of markedly greater commercial utility than the raw resin. As pointed out above, products of this type are unique in having a softening point at least 20° C. higher than unplasticized polyvinyl chloride and by a heat-stability in air of at least 10 minutes at 400° F.

As indicated above, all the described materials are characterized by molecular weight and a structure in which the ratio of 1,2-dichloroethylene units to 1,1-dichloroethylene units is very high. Products of this type are characterized by the absence in their structure of destabilizing groups and by intrinsic viscosities as high or higher than those of the corresponding original resin.

Products answering these descriptions are made by a unique photochemically-induced chlorination of macrogranular particles of a high quality, high molecular weight polyvinyl chloride resin at temperatures below about 65° C. while suspended in an essentially inert liquid medium having at most a mild swelling action on the polymer and while maintaining an excess of dissolved chlorine, especially in those portions of the reaction mixtures most strongly exposed to photochemical activation. It has been found, contrary to accepted beliefs, that the chlorination reaction is very rapid and that the principal limiting factor is the concentration of dissolved chlorine at the locus or site of the reaction. It has been found that two factors are largely determinative of the rate of the reaction, namely, (1) the dissolved chlorine content and (2) the level of photochemical activation. In fact, it has been found that quite moderate levels of photochemical activation can easily outstrip the ability to dissolve chlorine in the mixture.

Prior art processes for chlorinating polyvinyl chloride have been operated, unknowingly, under conditions of acute chlorine-starvation. Consequently, reaction times of 10, 20 and even up to 100 hours at temperatures of 75 to 100° C. have been reported. The literature is seemingly preoccupied with the improvement of the solubility of the product. Prior known forms of chlorinated polyvinyl chloride are notorious for their instability and hence have no known use outside of the coating resin and fiber fields. While there have been reports of moderately increased softening points and lowered solubilities of certain products, these have been indicated as undesirable. Analysis of some of these prior art products has shown them to be highly degraded.

In contrast, the products of this invention are free of degradation and have extraordinary heat stabilities hitherto unknown among vinyl chloride polymers. Upon examination such products are found to have a remarkable combination of properties as an insoluble, solid, rigid structural and dielectric material taking them completely outside the usual fields of application of prior chlorinated polyvinyl chlorides. The more dense of these products are somewhat crystalline and form superior films and filaments. Analysis of pyrolysis gases evolved by these products indicates clearly the substantial absence of the 1,1-dichloroethylene structure (i.e. 2-7% or less).

These desirable products result when the photochemically-activated reaction is carried out at temperatures not higher than about 65° C. in the presence of an excess of dissolved chlorine. Moderately lower levels of photochemical activation assist in maintaining an excess of dissolved chlorine by materially reducing the rate of photochemical attack on the polymer.

In more preferred embodiments of the process, still other means are employed to facilitate the delivery of dissolved chlorine to the site of reaction. One such means is the employment of a porous polymer to speed the diffusion of chlorine to the interior of the particle. Another is the use of a small amount of a volatile chloromethylene swelling or wetting agent to open the polymer particles to diffusion of chlorine.

It has also been found undesirable to allow the dissolved chlorine concentration to fall to dangerous levels at any time that the polymer is exposed to chlorine in the presence of actinic activation. For example, if chlorine gas flow and illumination are commenced simultaneously it seems that a small amount of 1,1-dichloroethylene structure is formed early in the reaction and virtually none after equilibrium chlorine saturation values have been achieved. For these reasons it is believed to be better to presaturate the reaction mixture with chlorine before exposure to illumination. Likewise, it also appears better to allow some time for the polymer to combine with the swelling agent and for swelling to occur before adding chlorine and supplying illumination. By these means the formation of 1,1-dichloroethylene structure is minimized. Infra-red analyses of the structure of polymers made in this fashion indicate the substantial absence of the undesirable structural isomer.

For greatly increased stability in the product it is necessary to employ, as the swelling agent, a hydro-chloromethylene compound, that is, a chlorinated hydrocarbon containing at least one chlorine atom, at least one hydrogen atom and only one carbon atom. Such materials include monochloro methane; dichloro methane, and trichloro methane (chloroform). The hydro-chloromethylenes are greatly preferred over other chlorinated hydrocarbons because they react but slowly with chlorine and the final product of such reaction is carbon tetrachloride, an innocuous material easily-removed from the final polymer. Chlorinated ethylene and ethane derivatives, and other chlorinated higher alkyl hydrocarbons are readily converted to high-boiling poly-chloro derivatives very difficult to remove from the polymer. Some of the chloroethylene and chloro-ethane derivatives seem to inhibit the chlorination reaction.

For the production of chlorinated polyvinyl chloride resins of maximum stability and maximum softening temperature (for a given proportion of added chlorine), it is necessary to employ chloroform as the swelling-wetting agent. Chloroform is by far the most effective and it is unique in that it seems to produce the most stable resins and, further, seems to have a much more pronounced directive effect on the chlorination reaction. Chloroform seems to be a necessary ingredient when it is desired to produce a polymer in which substantially all the chlorinated vinyl chloride units are 1,2-dichloroethylene units. Further, chloroform seems to be a mild catalyst producing the fastest reactions. The mechanism by which chloroform functions is not understood. It is believed, however, that chloroform functions as a "free-radical acceptor" or "hydrogen-donor" acting to decrease the number of excess polymer radicals in localized areas of low chlorine concentration. By donating a hydrogen atom or a trichloromethylene group, chloroform satisfies the excess of polymer radicals induced by irradiation before they can disproportionate to 1,1-dichloroethylene groups, or form double bonds, or serve as loci for chain scission. Products made with chloroform have intrinsic viscosities as high or higher than the original polyvinyl chloride resin. Further, since the chlorinated products are completely soluble in hot tetrahydrofurane, hot cyclohexanone, or hot chlorobenzene, chlorination and the consequent gain in molecular weight (and in intrisinic viscosity) is not due to cross-linking.

In the process of this invention, the starting material must be a polyvinyl chloride resin having three essential characteristics, namely, (1) a high molecular weight; (2) a macro-granular form; and (3) purity and freedom from contamination and degradation. The molecular weight of polyvinyl chloride usually is expressed in terms of "specific viscosity," as defined below. Thus, to be usable in the process of this invention, polyvinyl chloride must have a minimum specific viscosity of at least as high as 0.40, more preferably at least about 0.45, and most perferably above about 0.50.

As used herein the terms "specific viscosity" and "intrinsic viscosity" are calculated values derived from viscosity measurements. Solutions for viscometric study are prepared by dissolving 0.35 gram of the chlorinated resin in 25 ml. of tetrahydrofurane while mildly heating and agitating on a solution roller. The solutions are then filtered into an appropriate Ubbelohde viscometer, previously calibrated for the pure solvent. The flow times in seconds for the solutions are determined at four different dilutions to obtain flow data at a number of concentrations. A portion of the original filtered solution is dried to constant weight at 130° C. to obtain a true concentration value. The ratio of the flow time to the flow time of the pure solvent is a value known as the "reduced viscosity." When the number (1) is substracted from "reduced viscosity," one obtains the value known as the "specific viscosity." When the "specific viscosity" is divided by the concentration and the values obtained plotted against concentration, the extrapolation of the resulting straight line to zero concentration gives one the value known as "intrinsic viscosity."

The "macro-granular" form of polyvinyl chloride resin is required to obtain the low slurry viscosity necessary for efficient agitation and to obtain low viscosity at high solids levels. It is necessary to vigorously agitate the chlorinating medium in order to facilitate chlorine solution and distribute the dissolved chlorine to each of the suspended resin particles. As used herein, the term "macro-granular" means a granular resin in which essentially all of the particles are above about 10 microns, more preferably a preponderant proportion above about 50 microns, in diameter. The coarsely-granular "general-purpose" grades of polymer containing particles up to 200 microns or more in diameter are perfectly satisfactory.

The proportion of such a resin in the slurry-like reaction mixture may vary quite widely up to a concentration of about 35-40% by weight. No real lower limit on slurry solids content exists, although practical economic considerations require a minimum of not less than about 5-10%. High solids levels are possible with macro-granular resins whereas extremely fine resins exhibit prohibitively high viscosities at 10% solids or less. The present process has the inherent advantage of high output for a given reactor unit volume.

The starting resin is strongly preferred to be somewhat porous in nature. It has been found that porous polymers increase the "chlorination efficiency" which is the ability of the reaction medium to induce a 1,2-dichloroethylene structure in the product. The use of a porous polymer so greatly facilitates the diffusion of chlorine as to permit the production of the highly stable 1,2-dichloroethylene type polymers under a wider range of operating conditions. Solid, nonporous polymers must be more highly swollen and require higher dissolved chlorine concentrations to produce acceptable products. For these reasons polyvinyl chloride resins containing from about 5 to about 50% by volume of pore space are strongly preferred.

By the term "polyvinyl chloride resin" is meant any thermoplastic polymer produced from a monomeric mixture containing not less than about 95% by weight of vinyl chloride. Thus, copolymers of vinyl chloride with minor amounts of 1-monoolefinic or vinyl-type (i.e. containing a single $CH_2=C<$ grouping per molecule) co-monomers can be utilized. Illustrative co-monomers are vinylidene chloride, vinyl acetate, methyl acrylate, styrene, acrylonitrile, methyl methacrylate, ethylene, propylene and others. Polyvinylchloride (i.e. the homopolymer) is greatly preferred. When copolymers are employed they must have a molecular weight at least equivalent to those given above for polyvinyl chloride.

According to the process of this invention, the polyvinyl chloride resin starting material is suspended in an inert liquid medium having a boiling point not over about 100° C. at atmospheric pressure and at most only a mild swelling action on the starting resin and on the chlorinated products. Such medium should have relatively little ability to react with chlorine or the resin and should be readily removed from the final product. Relatively few materials have these qualifications. Most hydrocarbons and chlorinated hydrocarbons are too readily chlorinated and are too high boiling for easy removal from the product. One satisfactory diluent medium is carbon tetrachloride and mixtures of carbon tetrachloride with from about 5 to about 15% by vol. of a hydrochloromethylene of the class defined. Such a medium is satisfactory for operation up to a density not above about 1.55 because the increased solubility of polymers having densities in the range 1.55 to 1.58 cause thickening or gelling of the reaction mixture and absorption of chlorine becomes very slow. More satisfactory are water and aqueous hydrochloric acid solutions, preferably containing from about 5 to about 25% by volume of a swelling agent such as carbon tetrachloride or, more preferably a hydrochloromethylene and most preferably chloroform. Water and aqueous hydrohalogen acid mediums are relatively more fluid than organic substances, have generally higher chlorine absorbing capacities, and have substantially no solvent effect on the polymer in either its original or any of its chlorinated forms. Aqueous media, however, are deficient in wetting and swelling tendencies so it is preferred to admix therewith a small proportion (see above) of a hydro-chloromethylene, preferably chloroform.

As indicated above, the reaction mixture must be maintained at a temperature below about 65° C. in order to obtain stable products. The products made at 55° C. are superior to those made at 65° C. and those made at 45° and 35° C. appear to be better than those made at 55° C. Temperatures as low as 0° C. can be employed, if desired although temperatures of from about 15 to about 55° C. are preferred. The chlorination rate appears to be less dependent on temperature in the range of from 25° to 65° C. than it does on illumination level. Due to the only mildly exothermic character of the reaction, no difficulties in temperature control are encountered even with the fastest reactions complete in 0.1 to 1 hour.

In general, it is preferred to carry out the reaction while taking precautions to exclude significant amounts of oxygen. This may be done by pre-heating to drive off dissolved oxygen or by purging with an inert gas such as hydrogen chloride or nitrogen. The presence of hydrogen chloride or other hydrohalogen acid is sometimes advantageous because of the density change induced in the diluent medium. Some polyvinyl chloride resins are too dense and are difficult to suspend. Others, and particularly the porous polymers have a tendency to float. Hydrogen chloride, under some circumstances, tends to cause the porous polymers to sink.

The chlorination reaction has been found to be very, very slow, or to proceed not at all, in the total absence of light. However, the source of actinic radiation for photochemical activation does not apper to be critical. In transparent glass laboratory equipment, the ambient room illumination level supplied by a high level fluorescent lighting system has been found sufficient to induce reaction. Better control of illumination level is afforded by employing sources of artificial light in close proximity to the reaction medium. Ordinary incandescent lamps have proven satisfactory although less sensible heat for a given level activation will be realized from mercury vapor or arc lamps. Neon glow tubes, fluorescent tubes, carbon arcs, and sodium vapor lamps may also be employed.

As indicated above, the level of illumination, or rather the level of activation derived therefrom, should be controlled or adjusted so as to stay within the chlorine-dissolving capacity of the medium in the particular apparatus employed. The destabilizing effects of excess illumination can be minimized both by insuring a high absorbed chlorine content and by limiting the time of exposure of the slurry thereto and removing the slurry from exposure to illumination before the dissolved chlorine supply is exhausted. The latter procedure can be carried out by suspending a light source concentrically within a throat structure enclosed in a concentric baffle, the whole being suspended in a reaction vessel together with an agitator adapted to draw reaction mixture from the body of liquid and pass it through the throat over the light source and then back into the body of liquid again. The entire baffling structure can be shielded to prevent light reaching the body of slurry in the vessel. A chlorine disperser tube or device can be located near the vortex of the agitator so that the liquid passing through the throat area will be rich in dissolved chlorine content. By-product hydrochloric acid gas can be separated from the liquid at the top of the main body of liquid. These operations can also be carried out by arranging a plurality of vessels, or a plurality of zones within a single vessel, to carry out successive steps of chlorine saturation and illumination. In more simple forms of apparatus, the light source can be turned off intermittently according to a timed sequence to provide intervals during which the chlorine level is allowed to build back up. In most cases the chlorine flow rate can be adjusted by visual observation of the color of the slurry.

It is possible to be easily misled by mere observation of chlorine gas in the gas discharge or vent line. High rates of chlorine flow will simply blow raw chlorine through the charge without appreciable increase in dissolved chlorine content. High-shear agitation will insure chlorine absorption. Actual visual observation of the color of the liquid is best, the appearance of the characteristic greenish-yellow color of dissolved chlorine being the most reliable indication of excess dissolved chlorine. In a suitable instance, the reaction vessel can be pressurized to increase the chlorine-absorbing capacity of the liquid. Whenever the illumination level and/or the time of exposure thereto is increased it is also necessary to increase the chlorine feed rate to guard against chlorine-starvation. However, since the ability in any given instance to dissolve chlorine is limited by apparatus, temperature and time, it is more practical to operate with either or both reduced activation levels and/or controlled exposure times in order to stay within the available chlorine supply. Even under the latter conditions reaction to densities above 1.60 in a half hour or less are easily obtained.

Following the completion of the chlorination step, the polymer slurry is simply filtered or centrifuged to free it of the liquid phase and the filter cake is neutralized by the addition of water-soluble alkali such as sodium, ammonium or potassium hydroxides, carbonates, phosphates, etc. The neutralized polymer is then washed with pure water to neutrality to remove residual electrolyte. Drying of the washed cake can be carried out in air or vacuum ovens, by suspension dryers, and the like employing temperatures, preferably below about 75° C. The water-wetted filter cake can be washed with alcohol or acetone to displace the absorbed water and then the alcohol- or acetone-wetted polymer dried in a vacuum oven at very moderate temperatures of about 50° C. Where it is desired to recover the hydrochloromethylene and its chlorinated products, the reaction slurry can be steam distilled and then worked up as described above.

The invention will now be more fully described with respect to several illustrative examples.

*Example 1*

In this example, a high quality, commercial grade of high molecular weight polyvinyl chloride ("Geon 101 EP," an easy-processing, general purpose type of resin made by the B. F. Goodrich Chemical Company, Cleveland, Ohio, having a specific viscosity of about 0.54) is chlorinated by a preferred procedure in an aqueous hydrochloric acid solution containing about 10% by volume of chloroform. The above-mentioned polymer is a fairly coarse, granular resin which passes a 42 mesh screen and which is retained 100% by a 200 mesh screen. The preponderance of the particles appear to be larger than 25 microns in diameter and they are porous. By actual measurement the pore space is from about 15 to about 20% by volume. Total surface area determinations, by the nitrogen absorption method, indicate that this resin has a total particle surface area about equivalent to a polyvinyl chloride resin having particles only 1 to 3 microns in diameter.

In this example, a mixture of 800 grams of "Geon 101 EP," 1600 ml. of concentrated (37%) hydrochloric acid, 1375 ml. of water, and 300 ml. of chloroform are charged to a 5-liter "creased," clear glass flask fitted with a stirrer, condenser, Dry-Ice trap, and a gas dip tube. The flask is arranged to be illuminated by a 100 watt mercury arc lamp positioned in close contact with the flask. A rotameter is provided in a chlorine supply line connected to the gas dip tube. The flask also is provided with a water bath and an air jet for cooling to make possible control of reaction temperature at about 55° C. The stirrer is rapidly rotated while the flow of chlorine gas is started at a rate equal to about 210 ml./min. at a rotameter reading of about 5.0. The mercury lamp is turned on after the chlorine flow has commenced. After about 1 hour of reaction a 500 ml. sample of the slurry is withdrawn, filtered, the filter cake digested 30 minutes in 5% $NaHCO_3$ solution and filtered again, the cake washed with water to neutrality, then flushed with alcohol on the filter and finally dried at 50° C. in vacuum oven to a constant weight. This product, identified as Sample "A," is a white, granular resin very similar in appearance to the original "Geon 101 EP."

The chlorine flow rate is maintained at rotameter reading of 5.0 or a level of about 210 ml./min. for a total of over five hours, with a 500 ml. sample of slurry being taken after 3 hours and another after 5 hours. These are, respectively, Sample "B" and Sample "C." These are worked up immediately by the procedure used with Sample "A." After 5 hours and twenty minutes the chlorine flow rate is raised to a rotameter reading of 11.0, or more than double the original rate. This higher rate is maintained for one hour and 10 minutes (i.e., total time 5.5 hours) after which the reaction is terminated and the remainder of the charge worked up as before to yield Sample "D."

The product in each case is a free-flowing granular, white powder much resembling the original polyvinyl chloride in appearance. The dried, raw resin samples are tested for density, percent chlorine, and dynamic extrusion properties, the latter being a test wherein a "consolidation" temperature and a "flow" temperature are determined. In the latter test, a sample of resin is placed in a temperature-controlled plunger cavity mold having an orifice in the bottom and a standard pressure is applied by means of the plunger. The cavity is then gradually heated up until (1) the powder coalesces or consolidates to a solid mass (the temperature at which this occurs is the "consolidation" temperature) and (2) until the consolidated mass begins to flow out of the orifice (the temperature at which this occurs is the "flow" temperature). The "consolidation" temperature is a value usually about 15° C. above what is more commonly known as a "second-order transition temperature." The remaining tests are carried out on discs molded in a 1 in. plunger mold for one minute at 10,000 lbs./sq. in. and 170° C. The data are as follows:

| Sample No. | Reaction Time, hrs. | Percent Wt. Chlorine | Density at 25° C. | Consolidation Temp., ° C. | Flow Temp., ° C. | Calculated Percent Conversion [1] |
|---|---|---|---|---|---|---|
| A | 1 | 58.98 | 1.438 | 100 | 150 | 11 |
| B | 3 | 60.38 | 1.457 | 107 | 151 | 19 |
| C | 5 | 62.36 | 1.493 | 117 | 153 | 32 |
| D | 6.5 | | 1.532 | 137 | 170 | 50 |
| "Geon 101 EP" | | 56.70 | 1.400 | 96 | 152 | |

[1] Proportion of vinyl chloride units chlorinated.

Samples "B" through "D" are milled on a two-roll plastic mill capable of roll temperatures up to 500° F. or higher. The resins of Samples "A" through "D" band very well on the mill, quite unlike unplasticized polyvinyl chloride which does not "band" or adhere to one roll and forms a loose sheet of "lacy" appearance. During milling of each sample, 3 parts by wt. per 100 parts by weight of resin (phr.) of "Ferro 1827X," a mixed barium/cadmium organic acid salt, and 0.5 phr. of "Ferro 904," an epoxy resin "booster" stabilizer (both made by Ferro Corporation, Cleveland, Ohio) are worked in. The stabilized mixture is then sheeted off and portions of the sheets subjected to heat at 400° F. in air to estimate their heat stability. The data below list the mill roll temperature, the batch temperature (temperature of the resin sheet during milling) and the heat stability observations.

| Sample No. | Mill Temp., ° F. | Batch Temp., ° F. | Heat Stability at 400° F. |
|---|---|---|---|
| "Geon 101 EP" | 340 | 340 | Failure in less than 5 min. |
| B | 395 | 390 | Tan color at 20 min. |
| C | 390 | 400 | Tan color at 20 min. |
| D | 397 | 410 | Tan color at 30 min. |

Other portions of the milled sheets are tested for tensile strength, ASTM "Sag" temperature, dynamic extrusion properties, "dipole peak" temperature, and loss factor (at the dipole peak).

| Sample No. | Tensile lbs./sq. in. | Consolidation Temp., ° C. | Flow Temp., ° C. | A.S.T.M. Sag, ° C. | Dipole Peak, ° C. | Loss Factor Max. |
|---|---|---|---|---|---|---|
| "Geon 101 EP" | | 89 | 140 | 69 | 104 | 1.40 |
| B | 8,800 | 106 | 146 | 86 | 120 | 1.22 |
| C | 9,340 | 117 | 151 | 95 | 131 | 0.90 |
| D | 9,870 | 135 | 166 | 107 | 144 | 0.53 |

The above data show clearly the improvement in properties with increasing chlorination. It further should be noted that the dynamic extrusion properties determined on the milled sheets do not differ appreciably from the corresponding values on the raw resin. Any differences noted are due to removal of residual solvent and/or the slight lubricating and plasticizing action of the stabilizers added. Clearly, the polymer was not degraded even after processing at roughly 50° F. higher than is normal for polyvinyl chloride. Further, note that the heat stability values reported are on the milled sheets. In other words each of the heat stability values should be increased by the amount of milling time at 390°–410° F. Truly, these products are amazingly stable; more stable than any previous known vinyl chloride polymer.

It should also be noted that sample "D" shows a relatively larger increase in chlorine content, density, stability, and dynamic extrusion properties than would be expected for the additional 1.5 hours of reaction time near the end of the reaction period. Such an increase must be due to the increased flow rate during the last stage. Because of this, the next examples are carried out employing successively higher flow rates throughout the reaction period.

*Example 2*

The procedure of the foregoing example is repeated employing an identical charge and identical conditions except for two changes adapted to increase the rate of chlorine absorption and diffusion namely, (1) a chlorine flow rate of 625 ml./min. and (2) water is added to maintain an adequate liquid level in the pot after sampling. In this case intrinsic viscosity measurements are made on the resins as a check on degradation. The data are as follows:

| Sample No. | Reaction Time, Hrs. | Percent/Wt. Chlorine | Density at 25° C. | Consolidation Temp., °C. | Flow Temp., °C. | I.V. | Percent Conv. |
|---|---|---|---|---|---|---|---|
| A | 2.0 | 61.2 | 1.462 | 112 | 150 | 1.16 | 24 |
| B | 3.5 | 63.60 | 1.525 | 130 | 163 | 1.26 | 45 |
| C | 5.75 | 68.1 | 1.592 | 170 | 202 | 1.20 | 69 |
| D | 8.25 | 70.7 | 1.637 | 194 | 235 | 1.42 | 82 |
| E | 10.50 | 71.9 | 1.652 | 187 | 245 | 1.30 | 88 |
| F | 14.5 | 72.5 | 1.678 | 165 | 220 | 1.00 | 95 |
| "Geon 101 EP" | | 56.7 | 1.400 | 95 | 154 | 1.18 | 0 |

Several observations can be made based on the comparison of the above values with those of Example 1. One is that the reaction rate in Example 2 is very nearly double that of Example 1, indicating that maximum chlorine flow rates and chlorine absorption has not yet been achieved. The next succeeding example will demonstrate the use of a still higher flow rate. Samples E and F show decreasing consolidation temperature and intrinsic viscosity values with increasing time of reaction. It is believed that the chloroform content of the reaction became exhausted. Succeeding examples will demonstrate that the latter may have occurred.

The samples A through D of Example 2 are subjected to milling and stabilization by a procedure similar to that of Example 1. The data are as follows:

| Sample No. | Batch Temp., °F. | Mill Temp., °F. | Consolidation Temp., °C. | Flow Temp., °C. | Dipole Peak, °C. | Loss Factor Max. |
|---|---|---|---|---|---|---|
| A | 365 | 365 | 111 | 146 | 126 | 1.15 |
| B | 370 | 370 | 127 | 162 | 141 | 0.69 |
| C | | 380 | 161 | 201 | 187 | 0.25 |
| D | | 425 | 195 | 231 | 200 | |

Samples "C," "D," "E" and "F" did not fuse at the mill temperatures of (425° F.) available in the equipment used. Again the resins show no signs of decomposition at temperatures as high as 425° F. indicating that their heat stability is equal to or greater than those of the resins of Example 1. Sample "F" is essentially poly-1,2-dichloroethylene.

Samples "A" through "F" are analyzed by means of the infra-red spectrometer to determine the proportion of 1,1-dichloroethylene units and the proportion of 1,2-dichloroethylene units in the resins. The concentration of vinyl chloride units is calculated from the chlorine analysis values assuming only one chlorine atom adds to a single vinyl chloride unit. The ratio of 1,1-dichloroethylene units to vinyl chloride units is determined from the ratio of infra-red absorption intensity at 9.50 microns to that at 7.47 microns. Analyzed (known) copolymers of vinyl chloride and vinylidene chloride are used to construct a calibration curve for determination of the above ratio. The concentration of 1,2-dichloroethylene units can be determined by difference, assuming that all chlorinated vinyl chloride units not determined to be 1,1-dichloro are 1,2-dichloro in nature. Study of this method indicates that the 1,2-dichloro structure does not interfere with absorption by the 1,1-dichloro and vinyl chloride units. The results are as follows:

| Sample No. | Density at 25° C. | Percent/Wt. of Chlorine | Percent Vinyl Chloride Units converted to 1,1-dichloroethylene Units | Consolidation Temperature, °C. | I.V. |
|---|---|---|---|---|---|
| A | 1.462 | 61.2 | 4.6 | 112 | 1.16 |
| B | 1.525 | 63.6 | 7.3 | 130 | 1.26 |
| C | 1.592 | 68.1 | 7.1 | 170 | 1.20 |
| D | 1.637 | 70.7 | 3.5 | 194 | 1.42 |
| E | 1.652 | 71.9 | 2.6 | 187 | 1.30 |
| F | 1.678 | 72.5 | 5.8 | 165 | 1.18 |

The infra-red analysis and intrinsic viscosity values tend to confirm that the good heat distortion or "sag" properties of the products of this invention are largely due to lack of degradation and their high 1,2-dichloroethylene content. However, similar analyses of other chlorinated polyvinyl chlorides indicate that it is possible to have comparable chlorine contents and varying heat stability. It is believed that unstable forms of chlorinated polyvinyl chloride may contain proportions of unstable groupings too small to be detected by infra-red absorption but which severely limit the stability of the resin.

*Example 3*

In neither of the preceding experiments had excess chlorine gas been noted at the condenser exit initially, indicating essentially complete utilization of the chlorine. As a result, in the present experiment the chlorine gas flow rate is double that of Example 2 or 1375 ml./min. In this experiment the charge, equipment and procedure are the same as in the preceding experiments with the exception that the charge is placed in the flask and heat and the chlorine flow, at a low rate, are turned on first and then, a half an hour later when the slurry is up to temperature, the 100 watt mercury arc lamp (A4–H100 type) is turned on. A small amount of chlorine gas is visible at the condenser outlet at this high rate of flow. The data are as follows:

| Sample No. | Reaction Time, Hrs. | Percent Wt. Chlorine | Density at 25° C. | Consolidation Temp., °C. | Flow Temp., °C. | I.V. | Percent Conv. |
|---|---|---|---|---|---|---|---|
| A | 2 | 65.9 | 1.561 | 140 | 169 | 1.18 | 58 |
| B | 4 | 70.58 | 1.632 | 183 | 220 | 1.15 | 7( |
| C | 6 | 71.75 | 1.652 | 185 | 230 | 1.20 | 85 |
| D | 7.5 | 71.93 | 1.662 | 186 | 234 | 1.24 | 91 |
| "Geon 101 EP" | | 56.7 | 1.400 | 96 | 152 | 1.18 | ( |

It is readily apparent that another marked increase in reaction rate is achieved by the use of this extremely high chlorine flow rate. Further, it should be noted that throughout the reaction the intrinsic viscosity is as high or higher than that of the starting resin.

Samples "A" and "B" of Example 3 are subjected to infra-red analysis according to the procedure of the preceding example. The tests indicate that in Sample "A," only 7.8% of the chlorinated vinyl chloride units were converted to the 1,1-dichloroethylene structure and in the case of Sample "B," only 5.4%. The outstanding stability of Sample "A" indicates a further improvement derived from a larger excess of dissolved chlorine. Samples "C" and "D" of Example 3 are molded at 425 to 500° F. under pressures of 5,000 to 10,000 lbs./sq. in. to form molded articles of exceptionally good dielectric properties.

*Example 4*

In this example, polyvinyl chloride is chlorinated without a swelling agent. The charge of materials employed consists of 600 grams of "Geon 101 EP," 1200 ml. of concentrated hydrochloric acid and 1030 ml. of water. The equipment and procedure are otherwise the same as that employed in the previous examples. Chlorine gas is passed into the fluid, rapidly-agitated slurry at a rate of 640 ml./min. and the mercury arc lamp is turned on while controlling the temperature at about 55° C. At first, no excess chlorine gas appears in the condenser indicating that even at this moderately high flow rate the resin is taking up the chlorine as fast as it dissolves in the medium. After about 20 minutes a small amount of chlorine gas can be detected at the condenser exit. After a total of seven hours' time the reaction is terminated. The data are as follows:

| Sample No. | Reaction Time, Hrs. | Percent/Wt. Chlorine | Density at 25° C. | Consolidation Temp., ° C. | Flow Temp., ° C. | I.V. |
|---|---|---|---|---|---|---|
| A | 2 | 63.1 | 1.511 | 116 | 151 | 1.09 |
| B | 4 | 66.45 | 1.569 | 137 | 166 | 1.00 |
| C | 6 | 68.4 | 1.600 | 147 | 175 | 0.96 |
| D | 7 | 68.7 | 1.614 | 149 | 177 | |
| "Geon 101 EP" | | 56.7 | 1.400 | 96 | 151 | 1.18 |

The above data indicate that the porous nature of the polymer permitted a fairly rapid uptake of chlorine even in the absence of a swelling agent. However, the product quality is not as good as those of the preceding examples, as is evidenced by the lower I.V. values above, and the physical properties of milled stocks listed below:

| Sample No. | Density at 25° C. | A.S.T.M. Sag., ° C. | Consolidation Temp., ° C. | Flow Temp., ° C. | Dipole Peak, ° C. | Loss Factor, Max. | Heat Stability, 400° F. |
|---|---|---|---|---|---|---|---|
| A | 1.51 | 89 | 112 | 150 | 126 | 0.70 | dark tan, 10 min. |
| B | 1.57 | 103.5 | 135 | 168 | 160 | 0.34 | black, 20 min. |
| C | 1.60 | 106 | 139 | 176 | | | burnt black on molding. |

The heat stability of the resins made without a swelling agent is low for resins of these density values. For example, compare Sample "C" above with Sample "C" of Example 2. The consolidation temperatures also are very low. It is concluded that a swelling agent is required for the production of an acceptable product. The infrared analysis shows a higher proportion of 1,1-dichloroethylene (i.e. over 10%) content for Samples "A"–"D," above. The next example is carried out with carbon tetrachloride as a substitute for the chloroform of the previous examples to determine (1) if another swelling agent can equal the performance of chloroform and (2) whether chloroform is unique.

*Example 5*

A mixture of 600 grams of "Geon 101 EP," 1630 ml. of water, 1200 ml. of 37% hydrochloric acid, and 230 ml. of carbon tetrachloride are employed in a chlorination carried out by the procedure of the foregoing examples at 45° C. utilizing a chlorine flow rate of 925 ml./min. for 118 minutes when Sample "A" is taken. Then the flow rate is increased to about 1350 ml./min. for an additional 70 minutes (188 minutes total) when Sample "B" is taken. After a total of 270 minutes the remainder of reaction mixture is worked up as Sample "C." The dried resins are white, finely granular and have the following properties:

| Sample No. | Density at 25° C. | Reaction Time, Minutes | A.S.T.M. "Sag" D648 | Consolidation Temp., ° C. | Flow Temp., ° C. |
|---|---|---|---|---|---|
| A | 1.522 | 118 | 97.5 | 128 | 168 |
| B | 1.608 | 188 | 130.5 | 163 | 194 |
| C | 1.636 | 270 | | 170 | 205 |

When these samples are pressed for one minute at 400° F., smooth discs are obtained which are much darker than other resins of this invention of comparable density. However, the discolored discs do not change appreciably when heated in air for as much as 20 minutes at 375° F. It should be noted that Sample "C," above, compares unfavorably with Sample "B" of Example 3 as regards consolidation and flow temperatures. It is clear that chloroform produces materials of better color, higher softening, and of better stability than does carbon tetrachloride and, therefore, is unique as a swelling-protective agent.

*Example 6*

In this example, three chlorination reactions are conducted, one at 35° C.; one at 45° C.; and one at 55° C. The object is to illustrate the effect of temperature on the course of the reaction. The reaction mixture in each case is made up of 600 grams of "Geon 101 EP," 1200 ml. of concentrated hydrochloric acid, 1030 ml. of water, and 230 ml. of chloroform. Illumination is supplied by the same 100 watt mercury arc lamp used in the preceding examples. In each case the reaction mixture is heated to reaction temperature while passing nitrogen through the flask. When reaction temperature is reached the nitrogen flow is cut off and chlorine gas bubbled into the slurry at approximately 640 ml./min. while rapidly agitating the mix. At this chlorine flow rate, excess chlorine is noted leaving the condenser in both the 35° and 55° C. reactions but not in the case of the 45° C. experiment. It is not known whether there is an optimum for chlorine absorption, although it is possible that at 35° C. the diffusional process may be slower and at 55° C. the actual solubility of chlorine may be lower than at 35° to 45° C.

Approximately 25 to 30 minutes after commencement of chlorine feed the mercury lamp is turned on. Samples of slurry are withdrawn at intervals and worked up by a procedure slightly different from that of the preceding examples. The slurry sample is first subjected to steam stripping for 25 to 30 minutes in a distillation flask to recover and measure residual swelling agent. After steam stripping the slurry is filtered, washed with water, then with 5% NaHCO₃ solution, again with water and finally with ethanol. The ethanol wetted filter cake is dried in a vacuum oven at 50–60° C. In the 55° C. experiment only, the condensate from the steam stripping operation is separated into layers and the lower chloroform/carbon tetrachloride layer washed with water, 5% NaHCO₃ solution, twice with water again, and finally dried over anhydrous MgSO₄. The refractive index is then determined to estimate the proportion of chloroform in the dried liquid. The amount of chloroform consumed (assuming the remainder is converted to carbon tetrachloride) is then calculated on the basis of ml./hr./100 grams of polyvinyl chloride in the original charge. The data are as follows:

| Sample No. | Reaction Temp., °C. | Reaction Time, hrs. | Percent/Wt. Chlorine | Density at 25° C. | Consol. Temp. | Flow Temp. | CHCl₃ ml./hr./100 g. | Percent Conv. |
|---|---|---|---|---|---|---|---|---|
| A | 55 | 2.0 | 61.45 | 1.496 | 118 | 155 | 9.0 | 37 |
| B | 55 | 4.0 | 65.24 | 1.578 | 145 | 176 | 4.0 | 66 |
| C | 55 | 6.0 | 67.70 | 1.643 | 165 | 209 | 6.0 | 83 |
| D | 45 | 2.0 | 63.24 | 1.511 | 125 | 158 | | |
| E | 45 | 4.0 | 67.43 | 1.578 | 155 | 186 | | |
| F | 45 | 6.0 | 70.25 | 1.621 | 187 | 230 | | |
| G | 45 | 7.0 | 71.48 | 1.637 | 192 | 240 | | |
| H | 35 | 2.0 | 61.86 | 1.500 | 124 | 158 | | 37 |
| I | 35 | 4.0 | 67.02 | 1.575 | 160 | 187 | | 62 |
| J | 35 | 6.0 | 69.59 | 1.619 | 180 | 215 | | 74 |
| K | 35 | 7.0 | 69.73 | 1.629 | 181 | 214 | | 81 |

While the above data shows relatively little temperature dependence, the resins made at the lower temperatures are better than those made at 55° C. When Samples A and B (55° C.) and Samples H and I (35° C.) are milled with 3 phr. of "Ferro 1827X" stabilizer and then tested for heat stability, the following data are obtained:

| Sample No. | Density at 25° C. | Mill Temp., °F. | Batch Temp., °F. | Dipole Peak, °C. | Loss Factor, Max. | A.S.T.M. Sag., °C. | Tensile Strength, lbs./sq. in. |
|---|---|---|---|---|---|---|---|
| A | 1.496 | 390 | 405 | 129 | 0.91 | 93 | 9,300 |
| B | 1.578 | 430 | 460 | 147 | 0.34 | 118 | 11,090 |
| H | 1.500 | 390 | 405 | 132 | 0.82 | 92.5 | 9,270 |
| I | 1.575 | 405 | 422 | 171 | 0.28 | 128 | 10,840 |

These data show Sample "I" (made at 35° C.) is much higher in softening point than is its counterpart, Sample "B," made at 55° C. Heat stability of Sample H and I also is somewhat better (black in 45–60 minutes for "H" and "I" as against 20–30 minutes for "A" and "B"). When the experiment above is repeated at 65° C. there are obtained resins of slightly poorer stability than that of any of the above resins, although the 65° C. material is still much more stable than the original polyvinyl chloride.

Referring back to the data concerning the consumption of chloroform, it is readily apparent that the degradation sometimes incurred in the later stages of the reaction can be due, at least in part, to depletion of the chloroform supply. In this example, the average consumption seemed to be about 6 ml./hr./100 grams of polyvinyl chloride. This means that the chloroform supply may have been very nearly exhausted after about 6 hours of reaction. Carbon tetrachloride obtained as a by-product of the chlorination of chloroform seems to be fairly effective as a swelling agent but deficient as a protective "radical acceptor" or "hydrogen donor."

*Example 7*

In this example, three different polyvinyl chloride resins are chlorinated under essentially identical conditions to elucidate (1) the effect of a porous polymer against that of a closely similar polymer having no porosity and (2) to chlorinate two resins of widely differing molecular weights. The resins utilized are (1) "Geon 101 EP," the porous polyvinyl chloride utilized in the previous examples; (2) "Geon 101," a polyvinyl chloride closely similar to (1) but having no porosity (i.e. a general purpose grade of coarsely granular polyvinyl chloride having a specific viscosity of about 0.54 and composed of particles ranging from about 50 to about 200 microns); and (3) "Geon 100×6," a coarsely granular form of polyvinyl chloride having a particle size similar to resin (2), a porosity similar to resin (1), and a very materially higher molecular weight as shown by a specific viscosity of 0.85. The charge consists, in each case, of 600 grams of resin, 1600 ml. of water, 1200 ml. of concentrated hydrochloric acid, and 230 ml. of chloroform. Illumination is supplied by the 100 watt A4–H100 mercury arc lamp utilized in the previous examples. The reaction is started up by passing nitrogen gas through the flask during the heat up to 55° C. and then cutting off the nitrogen and turning on the chlorine and the lamp. A fritted glass filter stick is attached to the dip tube to assist in dispersing the chlorine gas. Chlorine flow is adjusted to about 800–850 ml./min. in the case of the "Geon 101 EP" and "Geon 100×6" experiments while in the experiment "Geon 101" the flow rate is 1200–1300 ml./min. under a slight positive pressure of about 11 inches of H₂SO₄ solution. Slurry samples are withdrawn at intervals and are worked up as in the previous examples. As a means of improving chlorine absorption, water and/or chloroform are added to maintain rapid agitation and adequate liquid level. Chloroform is added in an attempt to replace the chloroform consumed. The data are as follows:

| Sample No. | Reaction Time, hrs. | Chlorine Flow, cc./min. | Percent/Wt. Chlorine | Density at 25° C. | Consol. Temp., °C. | Flow Temp., °C. | Resin Employed |
|---|---|---|---|---|---|---|---|
| A | 2.25 | 850 | 68.84 | 1.599 | 157 | 189 | "Geon 101 EP." |
| B | 4.00 | 850 | 71.77 | 1.652 | 180 | 214 | Do. |
| C | 5.2 | 850 | 72.94 | 1.669 | 180 | 225 | Do. |
| D | 0.5 | 1400 | 60.12 | 1.462 | 100 | 160 | "Geon 101." |
| E | 1.0 | 1400 | 63.01 | 1.508 | 114 | 156 | Do. |
| F | 2.5 | 1400 | 68.70 | 1.622 | 160 | 197 | Do. |
| G | 2.0 | 640 | | 1.504 | 120 | 161 | "Geon 100× 6." |
| H | 3.0 | 640 | | 1.536 | 128 | 166 | Do. |
| I | 4.1 | 640 | | 1.575 | 147 | 181 | Do. |

It will be noted that the non-porous "Geon 101" does not yield a reaction rate as fast as that of its porous counterpart "Geon 101 EP." However, the "chlorination efficiency" is seen to be lower when one takes into account the higher chlorine flow rates utilized in the preparation of Samples "D" and "F." The higher molecular weight "Geon 100×6" chlorinates fairly well. While all the products are of acceptable stability, those made from the porous polymers are definitely superior. During milling, no significant differences in behavior are observed indicating molecular weight in the specific viscosity range 0.54 to 0.85 is not an important factor. The above data, however, clearly indicates that a porous polymer produces much better products in a much shorter reaction time, and should be strongly preferred.

*Example 8*

In this example, polyvinyl chloride is chlorinated to a moderate density while suspended in a carbon tetrachloride/chloroform medium. The reaction charge consists of 800 grams of the above-described "Geon 101 EP" resin, 2700 ml. of carbon tetrachloride, and 300 ml. of chloroform. No artificial source of illumination is employed in this example. However, the reaction is carried out in a clear glass flask fully exposed to the ambient illumination supplied by a modern, high-level fluorescent lamp installation delivering an average of about 65 foot candles. The slurry is stirred rapidly while dry hydrogen chloride is bubbled through it for about 30 minutes. Then the hydrogen chloride flow is cut off and dry chlorine gas is bubbled through the slurry at a rate of about 300 ml./min., a rate sufficient to cause chlorine to appear at the condenser exit. The temperature of the slurry is maintained in the range of 45 to 50° C. by heating and cooling, as necessary. After a period of 3 hours a 500 ml. sample (Sample A) of slurry is withdrawn and stored in a brown glass bottle. Chlorination is continued in the came fashion with samples being withdrawn at 6½ hours (Sample B); 10 hours (Sample C); 14 hours (Sample D); and the reaction is terminated at 18 hours (Sample E).

The above samples are worked up by a procedure comprising the steps: (1) mix slurry sample with equal volume of ethanol to insure precipitation of small amounts of soluble polymer, if any; (2) grind alcohol/carbon tetrachloride/chloroform/polymer mixture in a Waring Blendor for 5 minutes and let stand 30 minutes before filtering; (3) filter; (4) soak filter cake for one-half hour in 5% aqueous $NaHCO_3$ solution to neutralize; (5) filter; (6) wash filter cake with distilled water until neutral; (7) flush filter cake with ethanol to remove water; and (8) dry the alcohol-wetted filter cake to constant weight at 50° C. in a vacuum oven.

The product in each sample is a granular, white polymer very closely resembling the original polyvinyl chloride in appearance. The dried samples are analyzed for chlorine content, density, consolidation temperature and flow temperature. The data are as follows:

| Sample No. | A | B | C | D | E | "Geon 101 EP" |
|---|---|---|---|---|---|---|
| Percent/Wt. Chlorine | 58.53 | 63.26 | 67.30 | 68.9 | 69.54 | 56.7 |
| Density at 25° C. | 1.440 | 1.516 | 1.583 | 1.607 | 1.626 | 1.407 |
| Consolidation Temp. (° C.) | 103 | 128 | 158 | 165 | 165 | 97 |
| Flow Temp. (° C.) | 153 | 160 | 190 | 203 | 204 | 146 |
| Reaction Time, hrs. | 3 | 6.5 | 10 | 14 | 18 | |

The above data indicate that chlorinated polymers are obtained which compare quite favorably with products of similar density (1.40–1.58) made in aqueous systems. However, Samples "D" and "E" above are very definitely inferior to samples of comparable density made in the water/chloroform medium. These observations coincide with visual observations made during the reaction that between Samples "C" and "D" the medium became thick indicating an increasing proportion of the resin is passing into solution and interfering with chlorine absorption and also with chlorine dispersion through reduction of agitation.

These same samples are submitted to extensive testing and structure analysis including X-ray diffraction (Sample D); pyrolysis and analysis of the gases produced by the mass spectrometer; infra-red spectrum; and dielectric testing for dielectric constant at 1000 cycles at room temperature, maximum loss factor, and dipole peak temperature.

The X-ray diffraction pattern of Sample D differs radically from that of a vinyl chloride/vinylidene chloride copolymer of comparable (60% vinylidene chloride) dichloroethylene content. It is obvious from this that the chlorine did not enter the polymer as the 1,1-dichloroethylene structure. The infra-red spectrum likewise differs radically in the absorption intensity at 9.50 and 7.47 microns. Sample "D," according to infra-red, indicated that about 96.5% of the chlorinated vinyl chloride units are 1,2-dichloroethylene and only about 3.5% are 1,1-dichloroethylene. This is an interesting result, showing that high 1,2-dichloro structure is not solely responsible for high stability and high softening point. Obviously, other structures and/or lowered molecular weight may have contributed to the lowered consolidation and flow temperatures in Samples D and E.

Sample "D" pyrolyzes at 700° C. to form only (1) a black mass of solid carbon, (2) hydrogen gas, and (3) hydrogen chloride gas. Polyvinyl chloride, however, pyrolyzes under the same conditions to form the black carbon, hydrogen gas, hydrogen chloride gas, and, in addition, hydrocarbons including specifically benzene, toluene and xylene. Pyrolysis of chlorinated polyvinyl chlorides of density lower than Sample "D" produces reduced proportions of the aromatic hydrocarbons and shows that as the density increases the proportion of hydrocarbons diminishes. Vinyl chloride/vinylidene chloride copolymers pyrolyze to yield black carbon residue, hydrogen, hydrogen chloride, and chlorinated hydrocarbons, chiefly chlorobenzene. These data indicate that the chlorine added in Sample "D" is present primarily in chloromethylene units rather than as dichloro-methylene units.

The dielectric properties of the samples of Example 8 are highly interesting. Dipole peak temperatures (peak in curve of loss factor at 1000 cycles vs. temperature) are as follows:

| Resin | I.V. | Dipole Peak, ° C. | Loss Factor, Max. |
|---|---|---|---|
| "Geon 101 EP" | 1.13 | 108 | 1.3 |
| Sample B | 1.18 | 136 | 0.9 |
| Sample C | 1.21 | | |
| Sample D | 1.21 | 165 | 0.3 |
| Sample D | 1.18 | 172 | 0.2 |
| Sample E | 1.08 | 178 | 0.17 |

It is seen that the loss factor of Samples B through E is a materially reduced value and that progressive chlorination reduces it to a very low value. The loss factor at room temperature of Samples D and E is less than 0.1. Notice also that the dipole peak in each curve is shifted to very materially higher temperatures as the extent of chlorination is increased. During these tests it was also found that with increasing frequency the loss factor diminishes, in the range up to about 100 mc. Samples C through E are exceptionally good dielectric materials.

The intrinsic viscosity measurements reported above indicate that degradation may have begun in Sample E. This reduction in molecular weight is believed due to lowered dissolved chlorine content and unduly extended reaction time. A further interesting observation is that all of the samples are more stable to heat than "Geon 101 EP," although Sample D is much more stable than Sample E. In this example, it is clearly shown that lowered chlorine flow rates can be employed to produce excellent products if the illumination or activation level is correspondingly reduced. The level of illumination in Example 8 is a mere fraction of that existing when the mercury arc lamp is employed. Thus, the 300 ml./min. chlorine flow rate furnished an adequate dissolved chlorine content, at least in the early stages before thickening of the slurry occurred.

*Example 9*

In this example, 600 grams of "Geon 101 EP," 1300 ml. of water, 1,100 ml. of concentrated hydrochloric acid, and 230 ml. of chloroform are combined in a flask illuminated with two 100 watt mercury arc lamps, one on each side of the flask, and with two chlorine dip tubes, one on each side of the agitator. Total chlorine flow is maintained at about 2,600 ml./min. of chlorine while maintaining a temperature of 55–60° C. Samples are removed at short intervals in order to follow the course of the reaction. The data are as follows:

| Sample No. | A | B | C | D | E | F |
|---|---|---|---|---|---|---|
| Time-minutes | 5 | 10 | 26 | 35 | 42 | 46 |
| Density at 25° C., Calculated | 1.418 | 1.435 | 1.479 | 1.511 | 1.540 | 1.558 |
| Conversion, Percent | 4 | 11 | 27 | 40 | 50 | 56 |
| Consolidation Temp., ° C. | 96 | 100 | 112 | 123 | 130 | 135 |
| Flow Temp., ° C. | 147 | 145 | 147 | 157 | 162 | 165 |

Thus, in only 35 minutes, a density of 1.511 is obtained. With both lowered chlorine flow and lowered illumination, from 2 to 4 hours are usually required to reach the same density. This experiment shows (1) that when the dissolved chlorine and the activation level are kept in balance, very good products are obtained in a very short time and (2) that reaction rate is primarily determined by the dissolved chlorine level at the site of reaction.

*Example 10*

In this experiment several chlorinated polyvinyl chlorides made in the preferred water/chloroform system are compounded, on an equivalent volume basis, in a conventional polyvinyl chloride recipe containing plasticizers, stabilizers and fillers. The data appear below including, for purposes of comparison, a polyvinyl chloride control.

The above compositions handled well on the two-roll plastic mill, forming smooth sheets of excellent color and quality. Those of density from 1.490 to 1.545 also are easily extruded to form smooth-surfaced extrudates of excellent appearance. These formulations have at least 10° C. higher softening points than that of the polyvinyl chloride control.

Similar formulations are prepared according to the above general recipes except for the use of various plasticizers in varying amounts. The compositions are subjected to physical testing, the results being as follows:

| Composition No. | Plasticizer | phr. | Tensile, lbs./sq. in. | Elastic limit, lbs./sq. in. | 100% mod. | Ult. Elong., percent | ASTM Brittle Temp., ° C. |
|---|---|---|---|---|---|---|---|
| "Geon 101" (Control) | Dioctyl phthalate | 30 | 4,969 | 1,640 | 3,281 | 255 | −15 |
| D.O. | do | 50 | 3,087 | 472 | 1,405 | 315 | −25 |
| D.O. | do | 70 | 2,607 | 306 | 709 | 408 | −40 |
| Chlorinated Polyvinyl Chloride (D-1.590). | do | 80 | 5,263 | 5,263 | | 5 | −5 |
| D.O. | do | 50 | 4,037 | 868 | 2,912 | 157 | −20 |
| D.O. | do | 70 | 2,120 | 2,120 | 695 | 237 | −25 |
| D.O. | Dioctyl sebacate | 47 | 2,087 | 282 | 1,886 | 117 | −35 |
| D.O. | "Paraplex G-50" [1] | 50 | 4,151 | 113 | | 67 | 0 |
| D.O. | do [1] | 60 | 3,847 | 1,103 | | 63 | −5 |
| D.O. | Tricresyl phosphate | 60 | 4,350 | 844 | 2,723 | 158 | 0 |
| D.O. | "Santicizer 141" [2] | 50 | 2,399 | 2,287 | 1,445 | 172 | −25 |
| D.O. | "Hycar 1312" [3] | 51 | 4,729 | 3,164 | | 45 | |

[1] Commercially available epoxidized polymeric esters, Rohm and Haas.
[2] Made by Monsanto Chemical Co.
[3] A low molecular weight, semi-liquid copolymer of 67% by wt. of butadiene and 33% of acrylonitrile, made by B. F. Goodrich Chemical Co.

Several of the above compositions are equal to or superior to the polyvinyl chloride control in all properties. The data tend to indicate the plasticizers are, in general, slightly less effective in the chlorinated resin. Further work along these lines shows that the chlorinated polyvinyl chloride have stress-strain properties differing from the original polyvinyl chloride when compared in equivalent recipes. The former show a Hookean behavior up to a yield point followed by continued extension to break. The latter more closely resembles rubbers.

*Example 11*

In this experiment polyvinyl chloride is very lightly chlorinated by slurrying 5 grams of "Geon 101 EP" in 50 ml. of water in a clear glass flask, bubbling chlorine gas into the slurry for several minutes while exposed to the ambient illumination level furnished by a high-level fluorescent tube lighting system delivering an average of about 65 foot candles, and then placing the flask in an ultrasonic sound generator for several minutes. The slurry is then worked up as in the preceding examples and the resulting dry powder tested for gravity and rate of HCl liberation (a measure of heat stability). The product has a density of 1.40 gms./cc. showing that the density increase, if any, was within the limits of accuracy of the gravity determination. The HCl-liberation test is carried out by heating the dry powder at 180° C. while passing dry nitrogen through it. The nitrogen is then passed into a water-filled HCl-absorber. Titration of a portion of the absorber liquid reveals the amount of HCl liberated. A sample of untreated "Geon 101 EP" is tested in a similar fashion as a control. The lightly chlorinated resin of this example liberates only 0.085 millimole of HCl/grm. of polymer in 8,000 seconds as compared to 0.160 millimole for the control. It is clear that the addi-

| Material | "Geon 101 EP" parts/wt. | Cl-pvc 1.490 | Cl-pvc D=1.522 | Cl-pvc D=1.545 | Cl-pvc D=1.590 |
|---|---|---|---|---|---|
| Polymer | 100 | 106 | 108 | 110 | 113 |
| Dioctyl phthalate | 42 | 42 | 42 | 42 | 42 |
| Basic lead carbonate | 10 | 10 | 10 | 10 | 10 |
| Clay | 7 | 7 | 7 | 7 | 7 |
| Mill Temp., ° C. | 290 | 300 | 300 | 315 | 335 |
| Handling ease | OK | OK | OK | OK | OK | tion of even a very small amount of chlorine doubles the stability of polyvinyl chloride.

We claim:

1. A process for preparing a chlorinated polyvinyl chloride resin having a density at 25° C. in the range of 1.43 to 1.65 and characterized in that the resin, without added stabilizers, possesses a heat stability such that a pressed film thereof does not turn black when exposed for 10 minutes to air at a temperature of 375° F., said process comprising the steps of (1) preparing a suspension of a minor proportion of a solid polyvinyl chloride resin in a major proportion of a liquid aqueous medium, the polyvinyl chloride resin being (a) in macro-granular form having substantially all its particles above 10 microns in diameter (b) porous to the extent that its particles contain between about 5 and 50% by volume of pore space and (c) of high molecular weight such that it possesses a specific viscosity of at least 0.4, said suspension containing about 5 to 25% by volume based on the aqueous medium of a chlorohydrocarbon selected from the class consisting of monochloro methane, dichloromethane and chloroform, which functions as a swelling agent for the suspended polyvinyl chloride resin, (2) passing chlorine gas into said suspension, while said suspension is maintained under conditions of rapid agitation, a temperature no greater than about 65° C. and in the substantial absence of oxygen, substantially to saturate the aqueous phase of said suspension with chlorine (3) photo-illuminating said suspension, with chlorine dissolved in the aqueous phase thereof, and while maintaining said conditions, to induce chlorination reaction between the dissolved chlorine and the suspended, swollen, porous, macro-granular polyvinyl chloride resin and passing more chlorine gas into said suspension so that there is always present an excess of dissolved chlorine over that momentarily reacting with the suspended polyvinyl chloride resin (4) terminating the chlorination reaction when the desired amount of chlorine has reacted by extinguishing the photo-illumination and (5) separating from said suspension the solid macro-granular product of said chlorination reaction and neutralizing said product, whereby to obtain the desired chlorinated polyvinyl chloride resin.

2. The process of claim 1 wherein the polyvinyl chloride resin is polyvinyl chloride of a specific viscosity above about 0.5.

3. The process of claim 2 wherein the chloro-hydrocarbon is chloroform.

4. The process of claim 3 wherein the temperature during the chlorination reaction is about 35 to 45° C.

5. The process of claim 3 wherein the liquid aqueous medium is water.

6. The process of claim 3 wherein the suspension contains from 5 to 15% by volume of chloroform.

7. The process of claim 3 wherein the liquid aqueous medium is dilute hydrochloric acid.

8. A composition of matter comprising a chlorinated polyvinyl chloride resin having a density at 25° C. in the range of 1.43 to 1.65, characterized in that said resin, without added stabilizer, possesses a heat stability such that a pressed film thereof does not turn black when exposed for 10 minutes to air at a temperature of 375° C., said resin being prepared by the process of claim 1.

9. The composition of claim 8 wherein the resin is chlorinated polyvinyl chloride of density in the range of 1.43 to 1.65.

10. The composition of claim 9 wherein the density is about 1.55 to 1.58.

References Cited in the file of this patent

UNITED STATES PATENTS

| | | |
|---|---|---|
| 2,426,080 | Chapman et al. | Aug. 19, 1947 |
| 2,590,651 | Rosenberg | Mar. 25, 1952 |

OTHER REFERENCES

Weale: J. Chem. Soc., (June 1952), 2223, 2224.

Kainer: "Polyvinylchloride and Vinylchloride - Meschpolymerisate," pp. 120–125, Spunger, Berlin (1951).